United States Patent
Thornton

(10) Patent No.: US 10,056,833 B2
(45) Date of Patent: Aug. 21, 2018

(54) VOLTAGE REGULATOR FOR INDUCTIVE LOADS

(71) Applicant: Hamilton Sundstrand Corporation, Charlotte, NC (US)

(72) Inventor: Christopher Derek Thornton, Saint Charles, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 107 days.

(21) Appl. No.: 14/710,068

(22) Filed: May 12, 2015

(65) Prior Publication Data
US 2016/0336854 A1 Nov. 17, 2016

(51) Int. Cl.
| H02M 3/158 | (2006.01) |
| H02M 1/32 | (2007.01) |
| H02M 1/36 | (2007.01) |
| H02M 3/155 | (2006.01) |

(52) U.S. Cl.
CPC ............ *H02M 3/158* (2013.01); *H02M 1/32* (2013.01); *H02M 1/36* (2013.01); *H02M 3/1582* (2013.01); *H02M 3/1584* (2013.01); *H02M 3/1588* (2013.01); *H02M 2003/1555* (2013.01); *Y02B 70/1466* (2013.01)

(58) Field of Classification Search
CPC .... H02M 3/156; H02M 3/158; H02M 3/1588; H02M 2003/1566; H02M 3/155; H02M 3/1582; H02M 2003/1557; H02M 3/1563; H02M 2001/0009; H04B 2215/069
USPC .................................................. 323/280–285
See application file for complete search history.

(56) References Cited

U.S. PATENT DOCUMENTS

| 6,028,755 A * | 2/2000 | Saeki ................... H02H 7/1213 323/285 |
| 6,597,553 B2 | 7/2003 | Chilcote et al. |
| 6,853,174 B1 * | 2/2005 | Inn ...................... H02M 3/1588 323/284 |
| 7,489,120 B2 * | 2/2009 | Matthews ............. H02M 7/062 323/282 |
| 7,746,125 B2 | 6/2010 | Storms et al. |
| 8,093,924 B2 | 1/2012 | Kamenicky et al. |
| 2003/0223159 A1 * | 12/2003 | Jenkins ................. H02M 3/158 361/18 |

(Continued)

FOREIGN PATENT DOCUMENTS

| DE | 102013213028 | 8/2014 |
| EP | 0743123 | 11/1996 |

(Continued)

OTHER PUBLICATIONS

European Search Report for Application No. 16169350.2 dated Oct. 4, 2016.

*Primary Examiner* — Timothy J Dole
*Assistant Examiner* — Bryan R Perez
(74) *Attorney, Agent, or Firm* — Carlson, Gaskey & Olds, P.C.

(57) ABSTRACT

A voltage driver includes a voltage input and a voltage regulation controller with an on/off input. The voltage regulation controller is configured to control a switching converter in a first mode and a second mode. The switching converter is configured to operate as an open pass switch in the first mode and configured to operate as a closed pass switch in the second mode. The switching converter includes an inductive load control switch.

21 Claims, 2 Drawing Sheets

(56) References Cited

U.S. PATENT DOCUMENTS

| | | |
|---|---|---|
| 2007/0296278 A1 | 12/2007 | Sekiya et al. |
| 2008/0068868 A1* | 3/2008 | Williams ............ H01L 27/0605 363/21.06 |
| 2010/0283321 A1 | 11/2010 | Moosbauer |
| 2011/0044079 A1 | 2/2011 | Moosbauer |
| 2013/0057242 A1* | 3/2013 | Zambetti ............. H02M 3/1584 323/282 |
| 2014/0125244 A1 | 5/2014 | Nuhfer et al. |
| 2015/0263602 A1* | 9/2015 | Drda ....................... H02M 1/36 363/21.02 |

FOREIGN PATENT DOCUMENTS

| | | |
|---|---|---|
| EP | 2028760 | 2/2009 |
| EP | 2503685 | 9/2012 |
| JP | 2012529124 | 11/2012 |

\* cited by examiner

VOLTAGE REGULATOR FOR INDUCTIVE LOADS

TECHNICAL FIELD

The present disclosure relates generally to voltage regulators, and to a voltage driver including a switching regulator capable of limiting the current and voltage output to an inductive load.

BACKGROUND

In a control system, a voltage driver is used to energize an external system, such as a relay, contactor or solenoid valve. When used to drive an external load, the driver typically needs to protect itself and its upstream source from the possibility of a short-circuit or load impedance fault to either the load or its cable connections. In some circumstances the load may also need to be protected against excess voltage being passed to the load from the upstream source. Protection against short-circuit faults is usually implemented by way of a fuse, thermal breaker, over-current trip or current limit.

Existing voltage drivers utilize a pass transistor operated as a switch (fully on or fully off) during normal operation. The pass transistors are further controlled in a linear mode when a current limited mode of operation is desired. While in the linear mode, the pass transistor passes current while dropping a portion of the supply voltage across the input and output terminal of the pass transistor, in order to limit the current through the pass transistor to a maximum value. The drop in supply voltage induces power dissipation within the pass transistor. In alternative systems, where an overvoltage protection system is implemented alongside the pass transistor, the pass transistor acts as a linear voltage regulator and again dissipates a large amount of power due to the transistor being placed in the linear mode.

During the linear mode, the pass transistor dissipates a large amount of power. The large amount of power dissipation requires that the pass transistor be sized sufficient to handle the power dissipation. Such a transistor, however, is oversized for standard operations resulting in an increased cost and weight. Further, continued dissipation of the high amounts of power within the pass transistor over time can damage the pass transistor. To mitigate this effect, the pass transistor is required to be turned off in a short time period after being placed in the linear mode. As such, continued linear mode operations, such as voltage and current limiting, cannot be maintained for an extended period.

SUMMARY OF THE INVENTION

Disclosed is a voltage driver including a voltage input, a voltage regulation controller including an on/off input, the voltage regulation controller configured to control a switching converter in a first mode and a second mode, the switching converter being configured to operate as an open pass switch in the first mode and configured to operate as a closed pass switch in the second mode, and the switching converter including an inductive load control switch.

Also disclosed is a method for improving the response time of a voltage driver including: providing an on/off input to a switching regulation controller and an inductive load switch approximately simultaneously, and introducing a voltage clamp element into a switching regulator in response to receiving an off indication from the on/off input at the inductive load switch.

Also disclosed is a voltage driver including a voltage regulation controller including an on/off input, the voltage regulation controller configured to control a switching converter in a first mode and a second mode, the switching converter including an inductive load control switch configured to switch a voltage clamp element into the switching converter in response to receiving an off command from the on/off input.

These and other features of the present invention can be best understood from the following specification and drawings, the following of which is a brief description.

DETAILED DESCRIPTION OF AN EMBODIMENT

Figure 1:
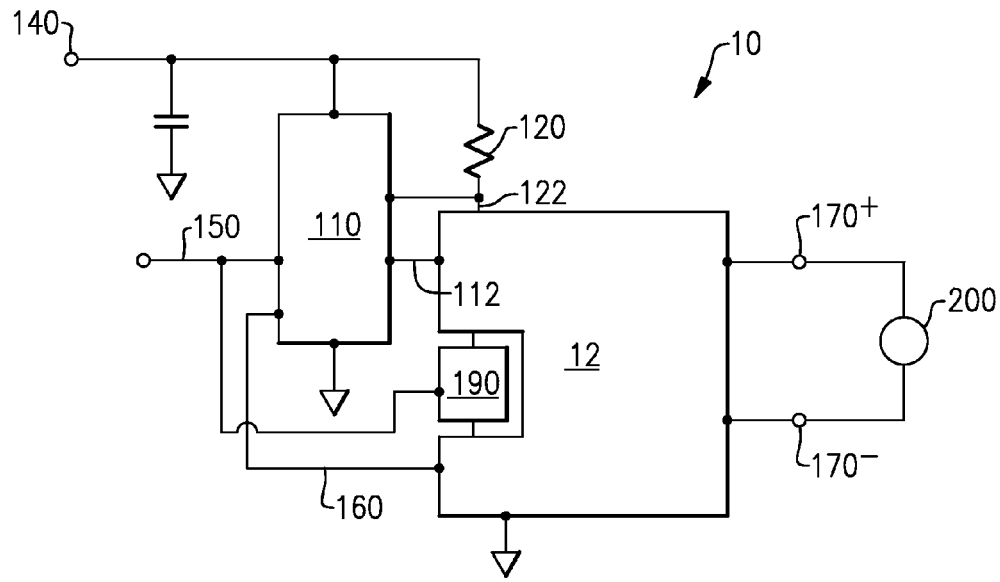
FIG. 1 schematically illustrates a voltage regulation output drive.

FIG. 1 illustrates a schematic view of a voltage driver 10 including a switching regulator 12 that functions as a voltage limiter in at least one mode of operations. The switching regulator 12 can further operate at 100% duty cycle in one mode of operations and 0% duty cycle in another mode. When operating at 100% duty cycle, the switching regulator 12 operates as a fully closed switch. When operating at 0% duty cycle, the switching regulator 12 operates as a fully open switch. In some examples, the switching regulator 12 can be a buck converter. The voltage driver 10 includes a switching regulation controller 110 with an on/off input 150. The on/off input 150 is connected to a control interface, such as a communications bus, and receives control signals for the voltage driver 10 from an external controller. The control signals indicate an intended state of power to be provided to a connected load 200. In one example, the control signal 150 is a binary on/off control signal.

An input voltage 140 is received from a voltage source, and is connected to the switching regulation controller 110, and a current sense resistor 120. The current sense resistor 120 is connected to the switching regulator 12. The switching regulator 12 is controlled by the switching regulation controller 110, according to known control techniques. The current sense resistor 120 provides a sensed current magnitude back to the switching regulation controller 110, via node 122, and allows the switching regulation controller 110 to utilize current based feedback controls.

Included within the switching regulator 12 is a voltage sensor configuration that provides a sensed voltage output 160 to the switching regulation controller 110. The combination of the current sense resistor 120 and the sensed voltage output 160 allows the switching regulation controller 110 to utilize both voltage and current based controls simultaneously. The switching regulator 12 includes a voltage output 170+/170−. The voltage output 170+/170− is connected to a load 200. In some examples, the load 200 is an inductive load, meaning that the load 200 induces an inductance within the overall circuit.

In aircraft electrical systems, the switching regulator 12 is often used to control a contactor or a solenoid valve. Contactors and solenoid valves are exemplary of inductive loads, although alternative inductive loads could also be utilized in conjunction with the circuit described herein. When a voltage is applied to the coil of a contactor or a solenoid valve via the voltage outputs 170+/170−, a mechanism within the contactor or solenoid is engaged as a result of current being passed through an electrical coil within the mechanism. Energy is stored in the coil, due to the innate inductance of the coil. The amount of energy stored is a function of the coil inductance and the magnitude of the current being applied to the coil.

In order to open, or disconnect, the contactor or solenoid, the voltage provided to the output voltage 170+/170− is removed, resulting in the removal of voltage from the inductive load 200, and from the coil within the inductive load 200. When voltage is removed from the coil, the energy stored in the coil must decay before the mechanism can release. In a typical inductance arrangement, the energy is released via current. The energy is most quickly dissipated by turning a drive output 112 of the switching regulation controller 110 off, and clamping a back electro-magnetic field (emf) induced across the coil to a specific value. A voltage clamp or a transient suppressor is used for this purpose. The lower the clamp value of the clamp or transient suppressor, the longer it takes for the current in the coil to decay and allow the mechanism to release.

Figure 2:
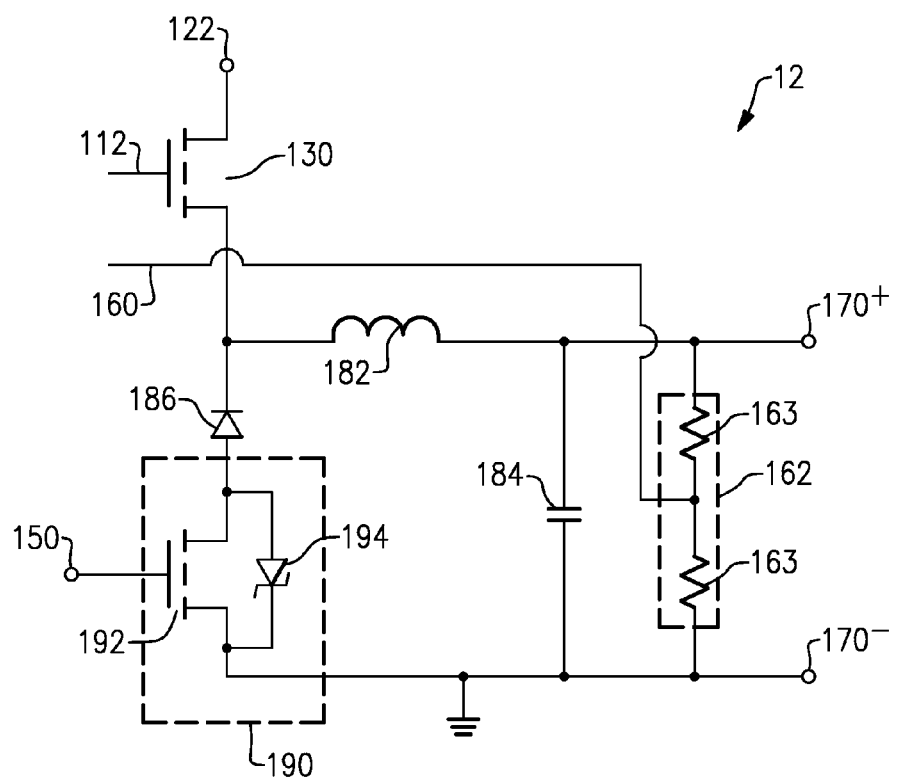
FIG. 2 schematically illustrates the switching regulator section of the output driver of FIG. 1, in greater detail.

In the illustrated example of FIG. 1, the switching regulator 12 includes an intrinsic diode 186 (illustrated in FIG. 2). The intrinsic diode provides a path for current to freewheel through the coil after the drive output has been turned off. The intrinsic diode effectively clamps the voltage across the contactor at an extremely low voltage level absent any additional clamping. The low voltage level of the clamp created by the intrinsic diode causes the coil current to decay slowly, and delays the release of the mechanism in the inductive load. As a result, the inductive load control current can decay slower than desirable.

In order to increase the response time of switching an attached inductive load, an inductive load switch 190 is incorporated into the switching regulator 12. The inductive load switch 190 includes a secondary switch that switches a voltage clamp into the circuit in series with the freewheeling diode 186, raising the clamped voltage level of the switching regulator 12 when the load 200 is switched off. In the illustrated example, the voltage clamp 194 element is parallel with the transistor 192. The raised clamp level dissipates the energy within the inductive load 200 at a significantly faster rate than a circuit without the inductive load switch 190, thereby allowing for increased response times. The inductive load switch 190 is, in one example, directly tied to the on-off input 150. Due to the direct connection, the inductive load switch 190 is switched off simultaneously, or approximately simultaneously, with the switching regulation controller 110 being instructed to switch open the inductive load 200.

With continued reference to FIG. 1, and with like numerals indicating like elements, FIG. 2 schematically illustrates an exemplary switching regulator 12 utilizing a buck converter topology. The exemplary switching regulator 12 can be utilized in the illustrated circuit of FIG. 1. The switching regulator 12 includes a transistor 130 with a control input 112. The control input 112 is connected to the switching regulation controller 110 and controls the duty cycle of the switching regulator 12 by controlling the on/off state of the transistor 130. A voltage input 122 is connected to one end of the transistor 130, and provides a current to an inductor 182, a capacitor 184, and a free-wheeling diode 186.

The inductor 182, capacitor 184 and free-wheeling diode 186 are arranged as a conventional switching regulator 12, such as a buck converter, and provide a voltage to the voltage output 170+/170−. The voltage output 170+/170− is reduced, relative to the voltage input 180 proportional to the duty cycle generated by the switching of the transistor 130.

The inductive load switch 190 is connected between the free-wheeling diode 186 and a negative voltage terminal 170− of the voltage output 170+/170−. Included within the inductive load switch 190 is a transistor 192, and a voltage clamp 194. The voltage clamp 194 is positioned in parallel with the transistor 192. In some examples the voltage clamp 194 can be a varistor. In yet further examples, the voltage clamp 194 can be Zener diode arranged to block current in the opposite direction to the free-wheeling diode. In yet further examples, the voltage clamp 194 can be another known type of voltage clamp, or a combination of voltage clamp types. While illustrated as a transistor 192, the switching element in the inductive load switch 190 can be an alternative switch type capable of functioning in a simpler manner.

The control input 150 of the transistor 192 is tied to the control input of the switching regulation controller 110 (illustrated in FIG. 1). When the control input 150 goes low (0 volts) the switching regulator controller 110 is instructed to turn the inductive load 200 off. Simultaneously, the transistor 192 opens, causing the only available current path through the switching regulator 12 to be through the voltage clamp 194. As the current passes through the voltage clamp 194, the energy from the inductive load 200 is dissipated in the voltage clamp 194. The dissipation in the voltage clamp 194 substantially increases the rate at which the energy is dissipated, thereby increasing the response time of the inductive load switching during a switch off cycle.

Also illustrated in the example of FIG. 2 is a voltage sensing configuration 162. The voltage sensing configuration 162 utilizes resistors 163 arranged as a voltage divider, and provides the sensed voltage to the switching regulation controller 110 (illustrated n FIG. 1) via a sensed voltage output 160.

Figure 3:
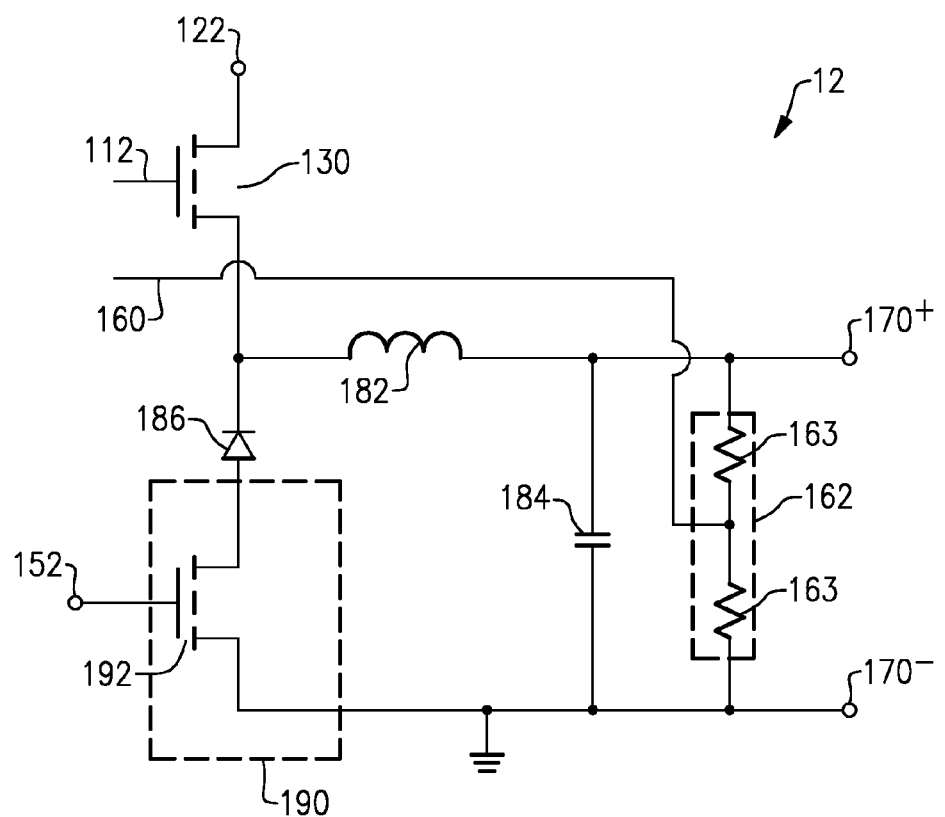

With continued reference to FIGS. 1 and 2, FIG. 3 illustrates an alternative exemplary switching regulator 12 utilizing a buck converter topology. The switching regulator 12 of FIG. 3 is constructed in fundamentally the same manner as the switching regulator 12 illustrated in FIG. 2 with the exception of the inductive load switch 190. In the example of FIG. 3, the inductive load switch omits the voltage clamp 194 illustrated in FIG. 2. Further, a control input 152 of the inductive load switch 190 is connected to the switching regulation controller 110. The switching regulation controller 110 controls the on/off state of the transistor 192 within the inductive load switch.

When an inductive load connected to voltage outputs 170+/170− is being switched off, the switching regulator controller 110 (in FIG. 1) can be used to place the transistor 192 (FIG. 3) in a linear mode. While operating in the linear mode, a voltage drop occurs across the transistor 192, and the linear mode transistor 192 can function in the same capacity as the previously described voltage clamp 194.

In alternative examples, a second controller, aside from the switching regulation controller 110, can be utilized in conjunction with the switching regulation controller 110 to generate the inductive load switch 190 controls.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A voltage driver comprising:
   a voltage input;
   a voltage regulation controller including an on/off input configured to receive a control signal at the voltage regulation controller, the voltage regulation controller configured to control a switching converter in a first mode and a second mode dependent upon the control signal received at the on/off input;
   the switching converter being configured to operate as an open pass switch in the first mode and configured to operate as a closed pass switch in the second mode; and
   the switching converter including an inductive load control switch, wherein the inductive load control switch includes a secondary switch configured to switch a voltage clamp into series with a free-wheeling diode of the inductive load control switch, and wherein the inductive load control switch further includes a control input configured to control an on/off state of the inductive load control switch, and wherein the control input of the inductive load control switch is directly connected to the on/off input of the voltage regulation controller.

2. The voltage driver of claim 1, wherein the first mode is a 0% duty cycle, the second mode is a 100% duty cycle.

3. The voltage driver of claim 1, wherein the inductive load control switch is configured to operate in an open mode, a closed mode, and a linear mode.

4. The voltage driver of claim 1, wherein the inductive load control switch comprises a switch element and a voltage clamp.

5. The voltage driver of claim 4, wherein the switching element is a transistor.

6. The voltage driver of claim 4, wherein the switch element is in parallel with the voltage clamp.

7. The voltage driver of claim 4, wherein the voltage clamp is a varistor.

8. The voltage driver of claim 1, wherein the inductive load control switch includes a control input, and wherein the control input is connected to the on/off input of the voltage regulation circuit.

9. The voltage driver of claim 1, wherein the voltage driver includes a voltage output connected to an inductive load.

10. The voltage driver of claim 1, wherein said voltage regulation controller is a switched-mode regulation controller.

11. The voltage driver of claim 1, wherein the voltage clamp increases a clamped voltage level of the switching converter.

12. The voltage driver of claim 1, wherein the voltage regulation controller is connected to the switching converter via at least one voltage regulation controller output signal.

13. The voltage driver of claim 1, wherein the voltage regulation controller is configured to control the switching converter via a drive output, and wherein the drive output is distinct from the on/off input.

14. A method for improving the response time of a voltage driver comprising:
   providing a single on/off input to a switching regulation controller and an inductive load switch approximately simultaneously;
   operating a switching regulator in a 100% duty cycle in response to an on command on said on/off input at said switching regulation controller, and operating the switching regulator in a 0% duty cycle in response to an off command on said on/off input at said switching regulation controller; and
   introducing a voltage clamp element into a switching regulator in response to receiving an off indication from said on/off input at said inductive load switch.

15. The method of claim 14, wherein introducing the voltage clamp element into the switching regulator comprises switching a transistor to an open state, where the voltage clamp element is parallel to said switch.

16. The method of claim 14, further comprising dissipating energy in an inductive load coil through said voltage clamp element and an intrinsic free-wheeling diode in series with said voltage clamp element, wherein the inductive load coil is connected to a voltage output of a switching regulator.

17. The method of claim 14, wherein the switching regulator is a buck converter drive circuit.

18. A voltage driver comprising:
   a voltage regulation controller including an on/off input and a drive output, the voltage regulation controller configured to control a switching converter in a first mode and a second mode via the drive output, the switching converter including an inductive load control switch configured to switch a voltage clamp element into said switching converter in response to receiving an off command from said on/off input, and wherein the inductive load control switch includes a control input directly connected to the on/off input of the voltage regulation circuit.

19. The voltage driver of claim 18, wherein the inductive load control switch includes a switching element in parallel with a voltage clamp element.

20. The voltage driver of claim 19, wherein the inductive load switch is arranged in series with a free-wheeling diode of said switching converter.

21. The voltage driver of claim 20, wherein the voltage clamp is a varistor.

* * * * *